US008459284B2

(12) United States Patent
Brennan et al.

(10) Patent No.: US 8,459,284 B2
(45) Date of Patent: Jun. 11, 2013

(54) METHOD AND MEANS FOR THE PREPARATION OF SOLUTIONS FROM DRY CHEMICALS

(75) Inventors: James P. Brennan, Ooltewah, TN (US); Zachary H. Adams, Marietta, GA (US); Paul Z. Cao, Cleveland, TN (US)

(73) Assignee: Arch Chemicals, Inc., Atlanta, GA (US)

( * ) Notice: Subject to any disclaimer, the term of this patent is extended or adjusted under 35 U.S.C. 154(b) by 312 days.

(21) Appl. No.: 12/884,785

(22) Filed: Sep. 17, 2010

(65) Prior Publication Data

US 2012/0067968 A1 Mar. 22, 2012

(51) Int. Cl.
*B01D 11/02* (2006.01)

(52) U.S. Cl.
USPC .................. 137/1; 137/268; 422/264; 239/9; 239/310

(58) Field of Classification Search
USPC .................. 137/268, 1, 888; 422/264; 239/9, 239/310
See application file for complete search history.

(56) References Cited

U.S. PATENT DOCUMENTS 4,462,511 A * 7/1984 Fulmer et al. ................ 137/268
5,089,127 A 2/1992 Junker et al.
5,384,102 A 1/1995 Ferguson et al.
5,427,748 A 6/1995 Wiedrich et al.
6,337,024 B1 1/2002 Hammonds
6,451,271 B1 9/2002 Hammonds
6,455,016 B1 9/2002 Tsuneki
6,482,358 B1 * 11/2002 Kelsch et al. ................ 137/268
6,915,811 B2 7/2005 Blanchette et al.
7,083,717 B1 8/2006 Hustelll et al.
7,143,778 B2 12/2006 Blanchette et al.
7,401,973 B1 7/2008 Lott
7,993,579 B2 * 8/2011 Williams et al. .................. 422/1
2004/0004903 A1 1/2004 Lins

* cited by examiner

*Primary Examiner* — Kevin Lee
(74) *Attorney, Agent, or Firm* — Lucas & Mercanti, LLP

(57) ABSTRACT

An apparatus for preparing a chemical solution includes a lower housing and an upper housing. The lower housing has a base, an upper plate having a central opening, and a side wall. A grid mounted on the upper plate covers the opening. A wall within the lower housing divides the interior of the lower housing into a central inner chamber and an annular outer chamber; this wall extends into an upper portion of the lower housing. One portion of the wall has a reduced height to permit fluid flow from the inner chamber to the outer chamber. A nozzle is mounted in the inner chamber for discharging fluid into the inner chamber, and causes local elevation of a portion of the fluid surface above the grid. The nozzle may be an eductor creating a venturi effect to draw fluid into the eductor.

48 Claims, 7 Drawing Sheets

METHOD AND MEANS FOR THE PREPARATION OF SOLUTIONS FROM DRY CHEMICALS

FIELD OF THE DISCLOSURE

This disclosure relates to water treatment, and more particularly to apparatus for introducing solutions of dry chemicals into a water stream.

BACKGROUND OF THE DISCLOSURE

Water treatment is needed in a variety of applications. Untreated water provides a hospitable environment for the growth of bacteria, algae, and other undesirable and potentially unhealthful organisms. It has become common practice to treat water on a periodic or continuous basis by introducing treatment chemicals to control such organisms.

Chemical feeders have been developed for bringing water into contact with solid, dry treatment chemicals so that the chemical material is dissolved in the water in a controlled manner. In a typical application of a chemical feeder, the feeder dissolves solid pellets of calcium hypochlorite (cal hypo) to introduce chlorine into the water stream; the quantity of chlorine in the water is generally expressed as a concentration of free available chlorine (FAC). An effective feeder design must provide dissolution at a desired rate, so as to maintain the desired FAC concentration, while avoiding undesirable deposits or residues; this is especially important in the case of cal hypo which produces calcium carbonate deposits. In particular, it is desirable to implement a chemical feeder that can continuously deliver a high concentration of FAC for an extended period of unattended operation.

BRIEF SUMMARY OF THE DISCLOSURE

In accordance with the disclosure, an apparatus and method are provided for preparation of a chemical solution.

According to one aspect of the disclosure, ah apparatus includes a lower housing and an upper housing. The lower housing has a base, an upper plate, and a side wall; the upper plate has a central opening therein. The upper housing has a side wall, a lower extremity of which is connected to the upper plate. A grid is mounted on the upper plate and covers the central opening; the grid forms at least a portion of a lower boundary of an upper chamber within the upper housing. A wall within the lower housing divides the interior of the lower housing into a central inner chamber and an annular outer chamber; this wall has a height substantially equal to an interior height of the side wall of the lower housing. One portion of the wall has a reduced height to permit fluid flow from the inner chamber to the outer chamber. A nozzle is disposed in the inner chamber for discharging fluid into the inner chamber toward the grid, so as to cause a fluid surface in the inner chamber to be locally elevated in a portion of said surface. In an embodiment, the nozzle is an eductor having fluid intake ports to create a venturi effect and thereby draw fluid in the inner chamber into the eductor.

In operation, the eductor causes the fluid surface in the inner chamber to be locally elevated in an area above the nozzle, so that the surface in that area rises above the grid; the fluid rising above the grid dissolves chemical material located in the upper chamber and disposed on the grid. The chemical material may be in the form of tablets, briquettes, chips, pellets, granules, etc. Dissolved material then drops down through the grid into the inner chamber and mixes with fluid in the inner chamber. The chemical solution then flows from the inner chamber to the outer chamber and out through an outlet port.

According to another aspect of the disclosure, a method for preparing a chemical solution includes the steps of providing a chemical feeder with an upper housing having a grid at the bottom thereof and lower housing having a nozzle oriented so as to discharge water vertically upward toward the grid; discharging fluid from the nozzle to cause a fluid surface in the chemical feeder to be locally elevated in an area above the nozzle, so that the surface in that area rises above the grid; dissolving chemical material disposed on top of the grid, in accordance with the fluid rising above the grid; and conducting a mixture of water and the dissolved material out of the lower housing.

The foregoing has outlined, rather broadly, the preferred features of the present disclosure so that those skilled in the art may better understand the detailed description of the disclosure that follows. Additional features of the disclosure will be described hereinafter that form the subject of the claims of the disclosure. Those skilled in the art should appreciate that they can readily use the disclosed conception and specific embodiment as a basis for designing or modifying other structures for carrying out the same purposes of the present disclosure and that such other structures do not depart from the spirit and scope of the disclosure in its broadest form.

DETAILED DESCRIPTION

Figure 1:
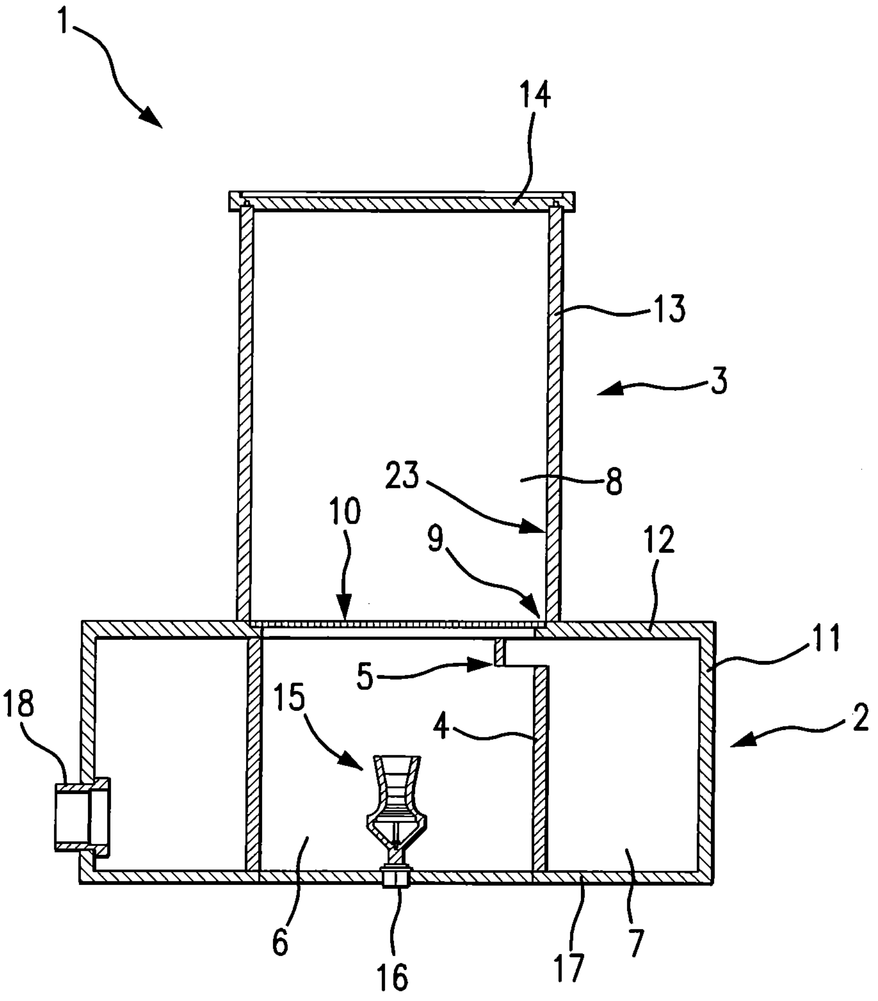
FIG. 1 is a schematic cross-section view of an apparatus for dissolving dry chemicals, according to an embodiment of the disclosure.

FIG. 1 illustrates an apparatus for dissolving dry chemicals (a chemical feeder 1) according to an embodiment of the disclosure. Feeder 1 has a lower housing 2 and an upper housing 3. (Components of feeder 1, including housings 2, 3, are shown as circular cylinders; it will be appreciated that alternate embodiments of the disclosure may have shapes other than circular cylinders.) Lower housing 2 has an outer side wall 11, an upper plate 12 and a base 17; the outer side wall extends upward from the base to the upper plate. In an embodiment, base 17 and side wall 11 define a cavity.

The upper plate 12 has a central opening which is covered by a grid 10. Upper housing 3 has a side wall 13, the bottom extremity of which connects to upper plate 12 while surrounding grid 10. The inner surface 23 of side wall 13, at the bottom extremity of side wall 13, is proximate to or adjacent to the outer edge 9 of grid 10. Upper housing 3 has a removable lid 14; in this embodiment, lid 14 is secured to the top edge of side wall 13 by an O-ring seal. As shown in FIG. 1, the interior space bounded by side wall 13 forms an upper chamber 8 with grid 10 at the bottom thereof.

A wall 4 within lower housing 2 surrounds the central portion of the interior of lower housing 2, and accordingly divides the interior of lower housing 2 into an inner chamber 6 and an annular outer chamber 7. (Inner chamber 6 is thus located within the cavity defined by base 17 and side wall 11.) The bottom of wall 4 is connected to base 17. Wall 4 has a height substantially equal to the interior height of outer side wall 11, except for a portion in which the top of the wall has a cutout 5.

A nozzle is mounted in the inner chamber for discharging fluid toward the grid. In this embodiment, the nozzle comprises an eductor 15, mounted vertically so that an outlet port thereof is directed upward toward the grid. Eductor 15 has an inlet port connecting to a water feed line (not shown) through a coupler 16. In this embodiment, coupler 16 is disposed in an opening in base 17, connecting to the feed line underneath the base. Eductor 15 is configured to mix water from the feed line with chemical solution already formed in the feeder, drawing the solution through ports that create a venturi effect. The chemical solution is conducted out of the outer chamber of the feeder through an outlet port 18 located in the outer side wall 11.

Figure 2:
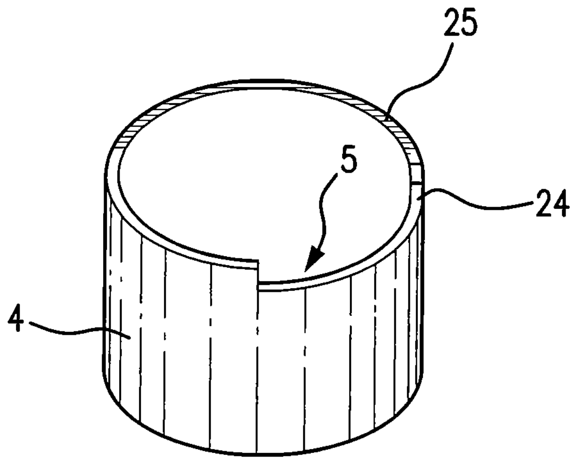
FIG. 2 is a perspective view of the inner chamber wall of the apparatus of FIG. 1.
Figure 5:
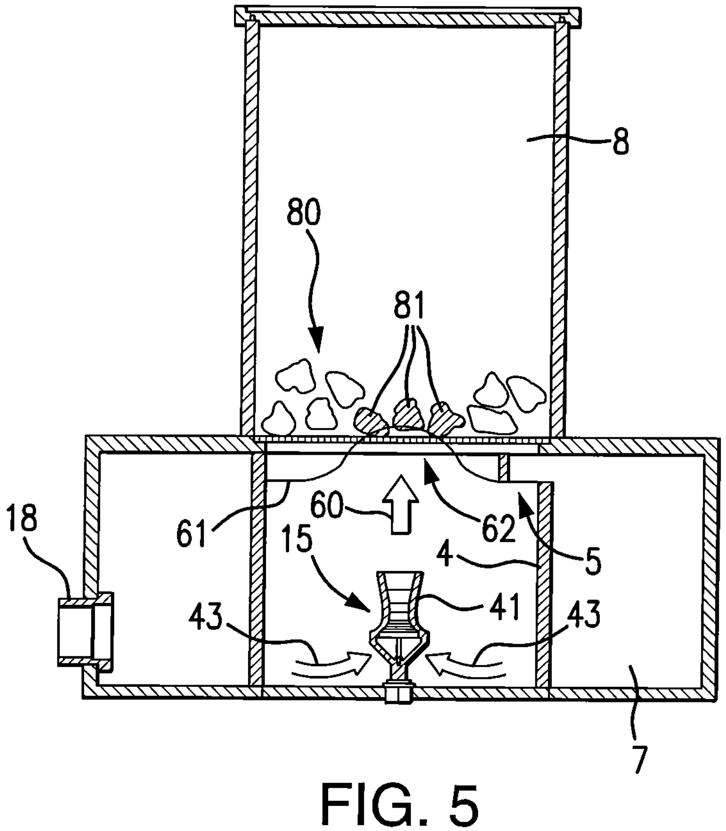
FIG. 5 schematically illustrates preparation of a solution from dry chemicals, using the apparatus of FIG. 1.

Interior wall 4 is shown in isolation in FIG. 2. In this embodiment, a portion of the wall (typically about 10° of arc), has its height reduced by cutout 5, permitting fluid flow from the inner chamber to the outer chamber over the wall at the cutout portion. The arc of cutout 5 may vary from 1° of arc to 360° of arc, in which case the entire wall has its height reduced to permit fluid flow over the wall in any direction. As shown in FIG. 2, the reduction in height is typically a small fraction of the height of the wall; when the wall is installed inside housing 2, the top edges 24, 25 of both the cutout portion and the remainder of the wall are in the upper part of the interior of housing 2. During operation of the feeder, chemical solution in the inner chamber 6 overflows into the outer chamber 7 over the reduced-height portion of the wall, and then exits the outer chamber through outlet port 18. Cutout 5 is oriented to be 180° opposite port 18 (see FIGS. 1 and 5), so that flow from the inner chamber into the outer chamber is in the direction opposite to flow out of the feeder through outlet port 18.

Figure 3:
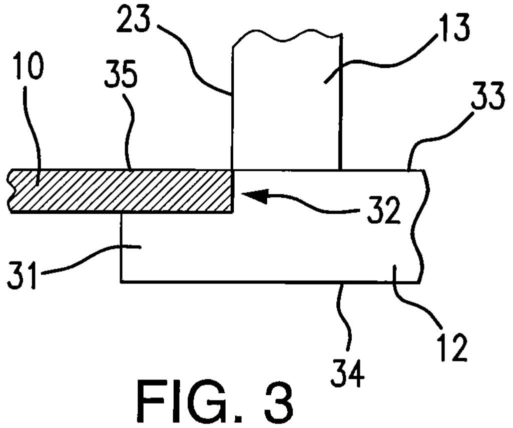
FIG. 3 is a detail view of the grid support in the apparatus of FIG. 1.

FIG. 3 is a detail view of the outer edge portion of grid 10; grid 10 covers the opening in upper plate 12 and is surrounded by wall 13. In this embodiment, upper plate 12 has a notch 32 formed therein, so that the thickness of upper plate 12 is reduced in an inner edge portion 31. Grid 10 is mounted on top of and supported by edge portion 31. The depth of notch 32 may be chosen so that the top surface 33 of upper plate 12 and the top surface 35 of grid 10 are coplanar. In addition, as shown in FIG. 3, the inner diameter of wall 13 may be matched to the diameter of grid 10 so that inner surface 23 of wall 13 is adjacent to the outer edge of the grid. As shown in FIG. 3, grid 10 generally has a uniform thickness less than that of upper plate 12; grid 10 does not extend below the plane of the underside 34 of upper plate 12.

Figure 4:
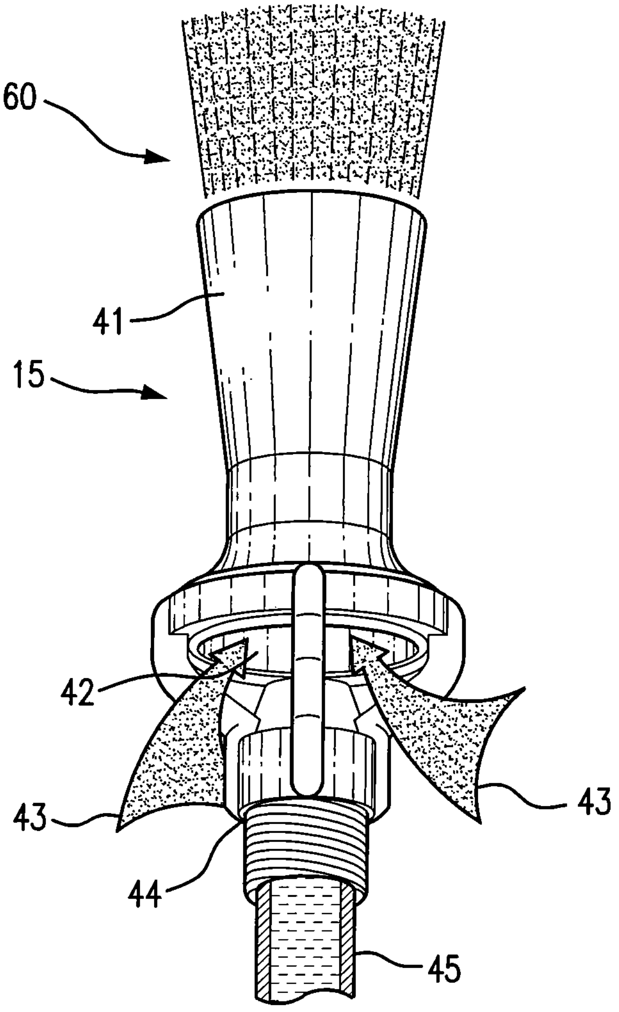
FIG. 4 illustrates details of an eductor used in the apparatus of FIG. 1.

FIG. 4 illustrates details of eductor 15; eductor 15 is for example a "Tank Mixing Eductor" from Spraying Systems Co., Wheaton, Ill. The eductor has an inlet port 44 that connects to water feed line 45, and a discharge port 41. (Coupler 16 is omitted from FIG. 4 to more clearly show the eductor inlet.) The eductor also has fluid intake ports 42 that create a venturi effect and thereby draw chemical solution back into the eductor, as shown schematically by arrows 43.

During operation of the feeder (see FIG. 5), pieces of dry chemical material 80 (in the form of tablets, briquettes, chips, pellets, granules, or the like) in upper chamber 8 rest on top of grid 10. Water enters the feeder through eductor 15. Discharge 60 from the eductor causes the fluid surface 61 in the inner chamber 6 to be locally elevated in an area 62 of the surface above the eductor. In this embodiment, the inner chamber is a circular cylinder with eductor 15 mounted in a radially central portion thereof; accordingly, the locally elevated portion 62 of the fluid surface will be at a central circular portion of the grid.

The surface of the fluid in this area 62 rises above the grid, so as to contact pieces 81 of the dry chemical resting on the central portion of the grid. The dry chemical pieces 81 thus dissolve, the dissolved chemical dropping down through the grid into the inner chamber 6 and resulting in formation of a chemical solution in inner chamber 6. As noted above, the chemical solution is drawn back into the eductor (arrows 43) through the eductor intake ports 42, and is again discharged through outlet port 41. The chemical solution overflows into outer chamber 7, spilling over wall 4 in the area of cutout 5; the solution then exits the feeder through outlet port 18.

Figure 6:
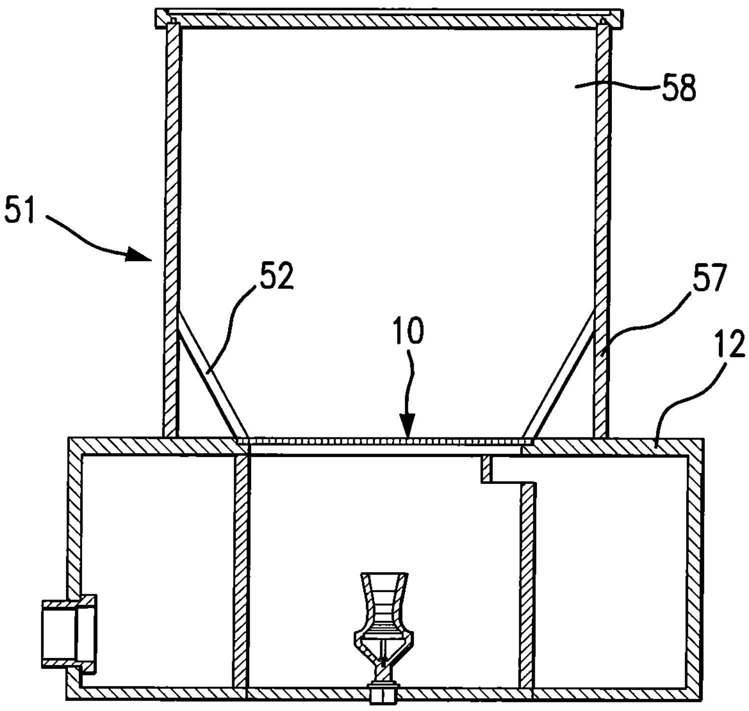
FIG. 6 is a schematic cross-section view of an apparatus for dissolving a larger quantity of dry chemicals, according to another embodiment of the disclosure.

FIG. 6 illustrates another embodiment of the disclosure, in which feeder 51 has an upper chamber 58 with a diameter larger than that of upper chamber 8 in feeder 1. Feeder 51 therefore can hold a larger quantity of dry chemicals; this is an advantage in applications where the feeder is to operate unattended for extended periods. The lower extremity of side wall 57 is spaced apart from the outer edge of grid 10. To direct pieces of dry chemical inward toward grid 10 and prevent pieces of dry chemical from landing on plate 12 instead of grid 10, chamber 58 has a cone-shaped insert 52 mounted therein.

Figure 7:
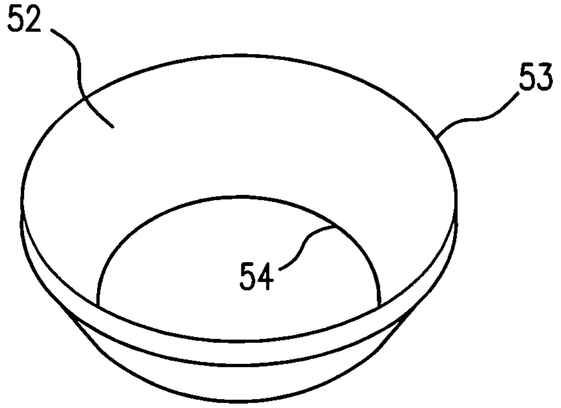
FIG. 7 is a perspective view of the upper chamber cone of the apparatus of FIG. 6.

Cone 52 is shown in isolation in FIG. 7. As shown in FIG. 7, cone 52 has a small lower open end and a large open upper end. The outer edge 53 of the upper end contacts the interior surface of the side wall of the upper housing, and the lower end has an inner edge 54 with a circumference approximately matching that of the grid, so that inner edge 54 is proximate to the outer edge of the grid.

Figure 8:
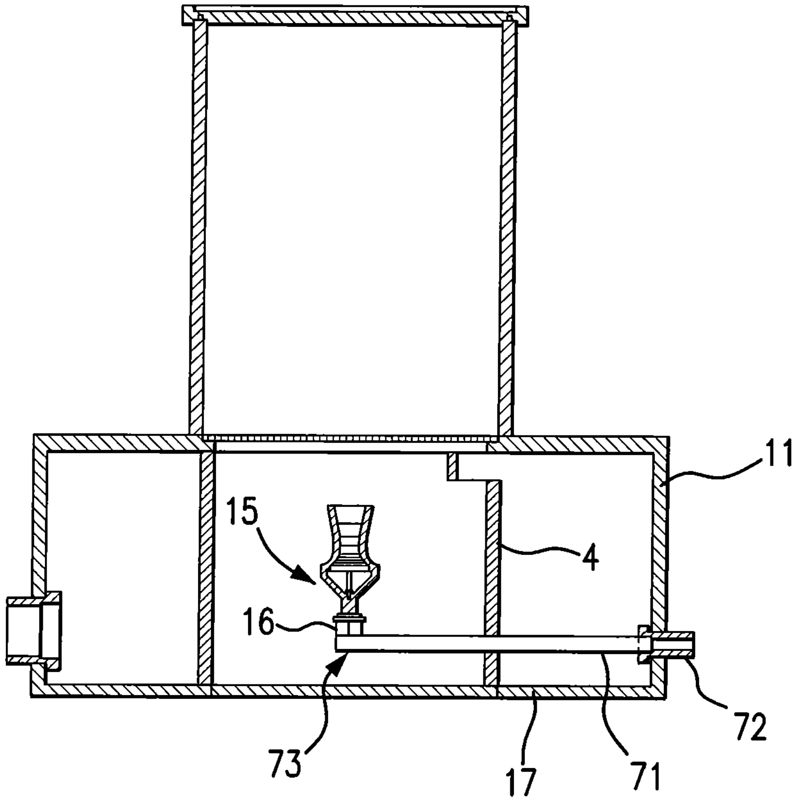
FIG. 8 illustrates an alternative arrangement of the eductor and eductor inlet, according to an additional embodiment of the disclosure.

In another embodiment, illustrated in FIG. 8, the water feed line connection is through the side wall 11 rather than through the base 17. Eductor 15 is connected through coupler 16 and a 90° elbow 73 to a substantially horizontal water feed line 71. Water feed line 71 extends through an opening in wall 4 and connects to inlet port 72.

Figure 9:
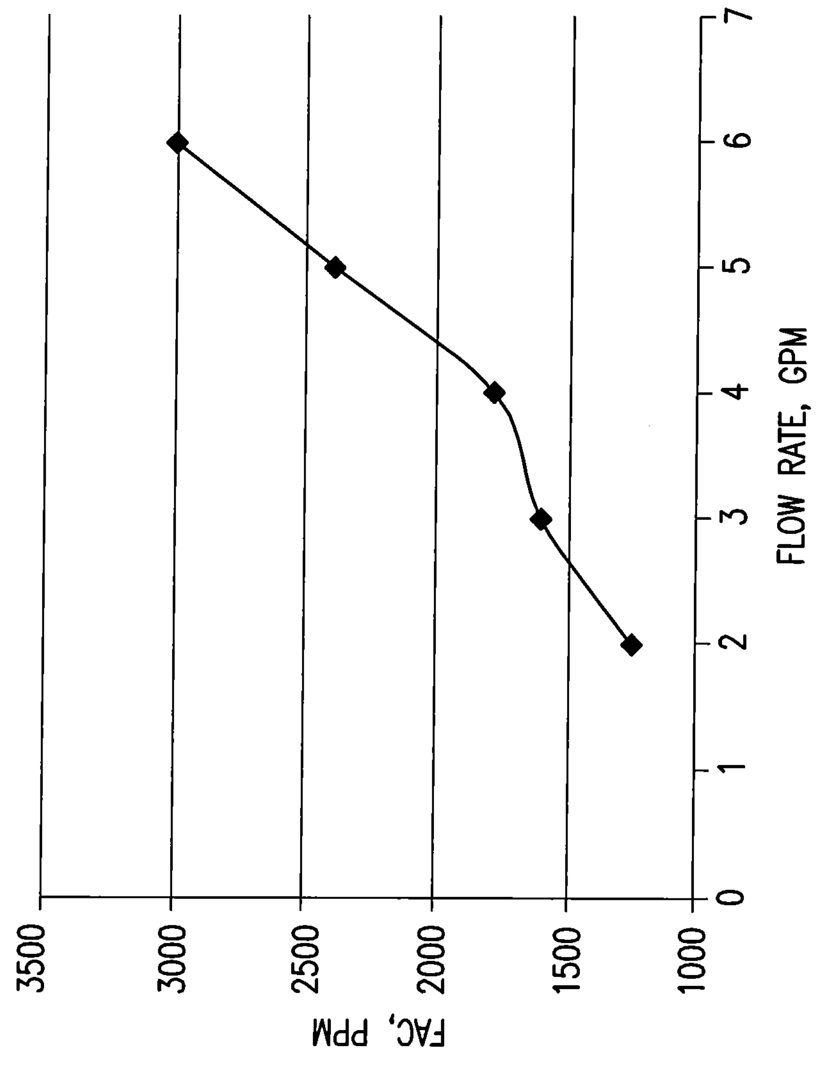
FIG. 9 is a graph showing free available chlorine (FAC) concentrations obtained with a chemical feeder embodying the disclosure at various water flow rates.

FIG. 9 shows concentrations of FAC in solution produced by a feeder embodying the disclosure at various flow rates. Flow rates were in the range 2-6 gallons per minute (GPM), corresponding to water pressure in the range 7.5-54 psi. The eductor inlet port had a diameter of approximately 3/8 inch, and the eductor outlet was located 3¾ inch below the grid. FAC concentrations were obtained in the range 1250-3010 ppm, varying nearly linearly with the flow rate. It will be appreciated that these FAC concentrations are substantially higher than obtained from typical chemical feeders.

While the disclosure has been described in terms of specific embodiments, it is evident in view of the foregoing description that numerous alternatives, modifications and variations will be apparent to those skilled in the art. Accordingly, the disclosure is intended to encompass all such alternatives, modifications and variations which fall within the scope and spirit of the disclosure and the following claims.

We claim:

1. An apparatus for preparation of a chemical solution, comprising:

a lower housing having a base, an upper plate, and a side wall, the side wall extending upwardly from the base to the upper plate, the upper plate having a central opening therein so that the upper plate has an annular shape;

an upper housing having a side wall, a lower extremity of said side wall connected to the upper plate;

a grid mounted on the upper plate and covering the central opening, the grid forming at least a portion of a lower boundary of an upper chamber within the upper housing;

a wall in the interior of the lower housing, said interior wall connected to the base and extending into an upper portion of the lower housing, said interior wall thereby dividing the interior of the lower housing into a central inner chamber and an annular outer chamber, at least a portion of said interior wall having a reduced height to permit fluid flow from the inner chamber to the outer chamber;

a nozzle disposed in the inner chamber for discharging fluid into the inner chamber toward the grid, so as to cause a fluid surface in the inner chamber to be locally elevated in a portion of said surface; and an outlet port in the side wall of the lower housing for conducting the chemical solution out of the outer chamber.

2. An apparatus according to claim 1, wherein said locally elevated portion of said surface is above the grid.

3. An apparatus according to claim 1, wherein the inner chamber is substantially cylindrical and said nozzle is disposed vertically in a central portion of the inner chamber, so that said locally elevated portion of said surface is above a central portion of the grid.

4. An apparatus according to claim 1, wherein said nozzle comprises an eductor.

5. An apparatus according to claim 3, wherein said nozzle comprises an eductor oriented so as to discharge fluid vertically upward toward the grid.

6. An apparatus according to claim 1, wherein said interior wall has a height substantially equal to an interior height of the side wall of the lower housing.

7. An apparatus according to claim 1, wherein the upper plate has a notch therein adjacent the central opening, thereby forming a reduced thickness portion of the upper plate, and the grid is mounted on top of said reduced thickness portion.

8. An apparatus according to claim 7, wherein the grid has a thickness and the notch has a depth relative to an upper surface of the upper plate, said depth being approximately equal to the thickness of the grid so that an upper surface of the grid and the upper surface of the upper plate are approximately coplanar.

9. An apparatus according to claim 4, wherein the eductor has fluid intake ports effective to create a venturi effect and thereby draw fluid in the inner chamber into the eductor.

10. An apparatus according to claim 5, wherein fluid rising above the grid is effective to dissolve chemical material located in the upper chamber and disposed on the grid.

11. An apparatus according to claim 10, wherein the chemical material comprises tablets, briquettes, chips, granules, or a combination thereof.

12. An apparatus according to claim 1, wherein said interior wall has a uniform height permitting fluid flow from the inner chamber to the outer chamber.

13. An apparatus according to claim 1, wherein said interior wall is a substantially circular cylinder, said reduced height is uniform in said portion of said interior wall, and said portion is at least 1° of arc.

14. An apparatus according to claim 13, wherein said portion is about 10° of arc.

15. An apparatus according to claim 1, wherein the grid has a diameter, and the side wall of the upper housing has an inside diameter greater than the diameter of the grid, so that the lower extremity of said side wall is spaced apart from an outer edge of the grid.

16. An apparatus according to claim 15, further comprising a cone-shaped insert disposed in the upper chamber and having an open lower end and an open upper end, the upper end larger than the lower end, the upper end having an outer edge contacting an interior surface of the side wall of the upper housing and the lower end having an inside diameter approximately equal to that of the grid, so that an inner edge of the lower end is proximate to the outer edge of the grid.

17. An apparatus according to claim 1, wherein the base has an opening for connecting to an external water feed line, and the nozzle connects to the water feed line through said opening.

18. An apparatus according to claim 17, wherein the nozzle is mounted vertically in the inner chamber, and further comprising an internal water feed line connecting said opening with the nozzle.

19. An apparatus according to claim 1, further comprising an internal water feed line connecting to the nozzle; and an inlet port in the outer side wall of the lower housing for connecting to an external water feed line, said internal water feed line connecting to the inlet port through an opening in the interior wall.

20. An apparatus according to claim 19, wherein the nozzle is mounted vertically in the inner chamber, and the internal water feed line further includes an elbow at an end thereof proximate to the nozzle.

21. An apparatus according to claim 1, wherein the portion of the interior wall having a reduced height is oriented 180° opposite the outlet port, so that a direction of flow from the inner chamber to the outer chamber is opposite a direction of flow out of the outer chamber through the outlet port.

22. A method for preparing a chemical solution, comprising:

providing a chemical feeder including an upper housing having a grid at the bottom thereof, and a lower housing having a nozzle installed therein, the nozzle oriented so as to discharge fluid vertically upward toward the grid, wherein the nozzle comprises an eductor;

discharging fluid from the nozzle to cause a fluid surface in the chemical feeder to be locally elevated in an area of said surface above the nozzle, so that the surface in said area rises above the grid;

dissolving chemical material disposed on top of the grid, in accordance with the fluid rising above the grid and thereby contacting the chemical material; and conducting a fluid mixture including the dissolved material out of the lower housing.

23. A method according to claim 22, wherein the lower housing has a wall in the interior thereof, said interior wall connected to a base of the lower housing and extending into an upper portion of the lower housing, said interior wall thereby dividing the interior of the lower housing into a central inner chamber and an annular outer chamber, at least a portion of said interior wall having a reduced height to permit fluid flow from the inner chamber to the outer chamber, and further comprising collecting the dissolved material in the inner chamber, the dissolved material mixing with fluid in the inner chamber to form said chemical solution;

and wherein said conducting step is performed subsequent to flow of the chemical solution from the inner chamber to the outer chamber.

24. A method according to claim 23, wherein said interior wall has a uniform height permitting fluid flow from the inner chamber to the outer chamber.

25. A method according to claim 23, wherein said interior wall is a substantially circular cylinder, said reduced height is uniform in said portion of said interior wall, and said portion is at least 1° of arc.

26. A method according to claim 25, wherein said portion is about 10° of arc.

27. A method according to claim 23, wherein the lower housing has an outlet port provided therein, and the portion of the interior wall having a reduced height is oriented 180° opposite the outlet port, so that a direction of flow from the inner chamber to the outer chamber is opposite a direction of flow out of the lower housing through the outlet port.

28. A method according to claim 22, wherein the lower housing has a base, and further comprising connecting an inlet port of the eductor to an external water feed line through an opening in the base.

29. A method according to claim 22, wherein the lower housing has a side wall, and further comprising connecting an inlet port of the nozzle to an internal water feed line, and connecting the internal water feed line to an external water feed line through an opening in the side wall.

30. A method according to claim 22, wherein the eductor has fluid intake ports effective to create a venturi effect and thereby draw the chemical solution in the inner chamber into the eductor.

31. A method according to claim 22, wherein the lower housing includes a base, an upper plate, and a side wall, the side wall extending upwardly from the base to the upper plate, the upper plate having a central opening therein so that the upper plate has an annular shape;

the upper housing has a side wall connected to the upper plate; and the grid is mounted on the upper plate and covers the central opening.

32. A method according to claim 22, wherein the chemical material comprises one or more tablets, briquettes, chips, granules, or a combination thereof.

33. An apparatus for preparation and delivery of a solution of a solid chemical material, comprising:

a housing having a base and an upwardly extending side wall, said base and said side wall defining a cavity;

an inner chamber having a side wall within said cavity, the bottom of the side wall of said inner chamber being adjacent to said base and the side wall of said inner chamber being spaced from the side wall of the housing, thereby forming an annular outer chamber;

a grid disposed above the side wall of said inner chamber, said grid being substantially parallel to the base;

a nozzle disposed in said inner chamber for discharging fluid in which said solid chemical material is soluble into said inner chamber toward the grid, so as to cause a fluid surface in the inner chamber to be locally elevated in a portion of said surface; and an outlet port in the side wall of the housing for conducting the chemical solution out of the outer chamber.

34. An apparatus according to claim 33, wherein the chemical material comprises one or more tablets, briquettes, chips, granules, or a combination thereof.

35. An apparatus according to claim 33, wherein fluid rising above the grid in said locally elevated portion is effective to dissolve chemical material disposed on the grid.

36. An apparatus according to claim 33, wherein said nozzle comprises an eductor.

37. In an apparatus for dissolving and delivering a solution of a solid chemical material including a housing having a base member and upwardly extending side walls, said base member and side walls defining a cavity, and a chamber having side walls within said cavity, the bottom of the side walls of said chamber being adjacent to said base member and the side walls of said chamber being spaced from the side walls of the housing, an improvement comprising:

a nozzle disposed in said chamber for discharging fluid in which said solid chemical material is soluble upwardly into an inner chamber, so as to cause a fluid surface in the inner chamber to be locally elevated in a portion of said surface.

38. An apparatus according to claim 37, wherein the side walls of said housing and the side walls of said chamber form substantially concentric vertical cylinders, and said nozzle is disposed vertically in a radially central portion of said chamber.

39. An apparatus according to claim 38, wherein said locally elevated fluid surface portion is a radially central portion of the fluid surface, so that fluid rising in said radially central portion is effective to dissolve chemical material located above the nozzle.

40. An apparatus according to claim 37, wherein said nozzle comprises an eductor.

41. An apparatus for preparation and delivery of a solution of a solid chemical material, comprising:

a housing having a base and an upwardly extending side wall, said base and side wall defining a cavity;

a substantially vertical hollow container extending above said cavity and in fluid communication with said cavity, said container having a side wall spaced from the side wall of said housing;

a plate connecting an upper terminus of the side wall of the housing to the container;

a grid having a plurality of perforations, said grid spaced from and substantially parallel to the base so that an upper surface of the grid has a spacing from the base equal to or less than that of an upper surface of said plate, said grid having an outer edge proximate to the side walls of said container, a nozzle disposed between the base and said grid for discharging fluid in which said solid chemical material is soluble toward the grid, so as to cause a portion of a fluid surface above the nozzle to be locally elevated above said grid; and an outlet port in the side wall of the housing for conducting the chemical solution out of the cavity.

42. An apparatus according to claim 41, wherein the chemical material comprises one or more tablets, briquettes, chips, granules, or a combination thereof.

43. An apparatus according to claim 41, wherein fluid rising above the grid in said locally elevated portion is effective to dissolve chemical material disposed on the grid.

44. An apparatus according to claim 41, wherein said nozzle comprises an eductor.

45. In an apparatus for delivering a solution of a solid chemical material, including a housing having a base and upwardly extending side walls, said base and side walls defining a cavity, and an elongated substantially vertical hollow container within said cavity, said container having side walls, the bottom of which are affixed to said base and which are spaced from the side walls of said housing, an improvement comprising:

a nozzle disposed within the container for discharging fluid in which said solid chemical material is soluble upwardly into the container, so as to cause a fluid surface in the container to be locally elevated in a portion of said surface.

46. An apparatus according to claim 45, wherein the side walls of said housing and the side walls of said container form substantially concentric vertical cylinders, and said nozzle is disposed vertically in a radially central portion of said container.

47. An apparatus according to claim 46, wherein said locally elevated fluid surface portion is a radially central portion of the fluid surface, so that fluid rising in said radially central portion is effective to dissolve chemical material located above the nozzle.

48. An apparatus according to claim 45, wherein said nozzle comprises an eductor.

* * * * *